Aug. 31, 1943.  R. B. CRABBS  2,328,058
MANUFACTURE OF HYDRAULIC CEMENT PRODUCTS
Original Filed April 4, 1933   2 Sheets-Sheet 1
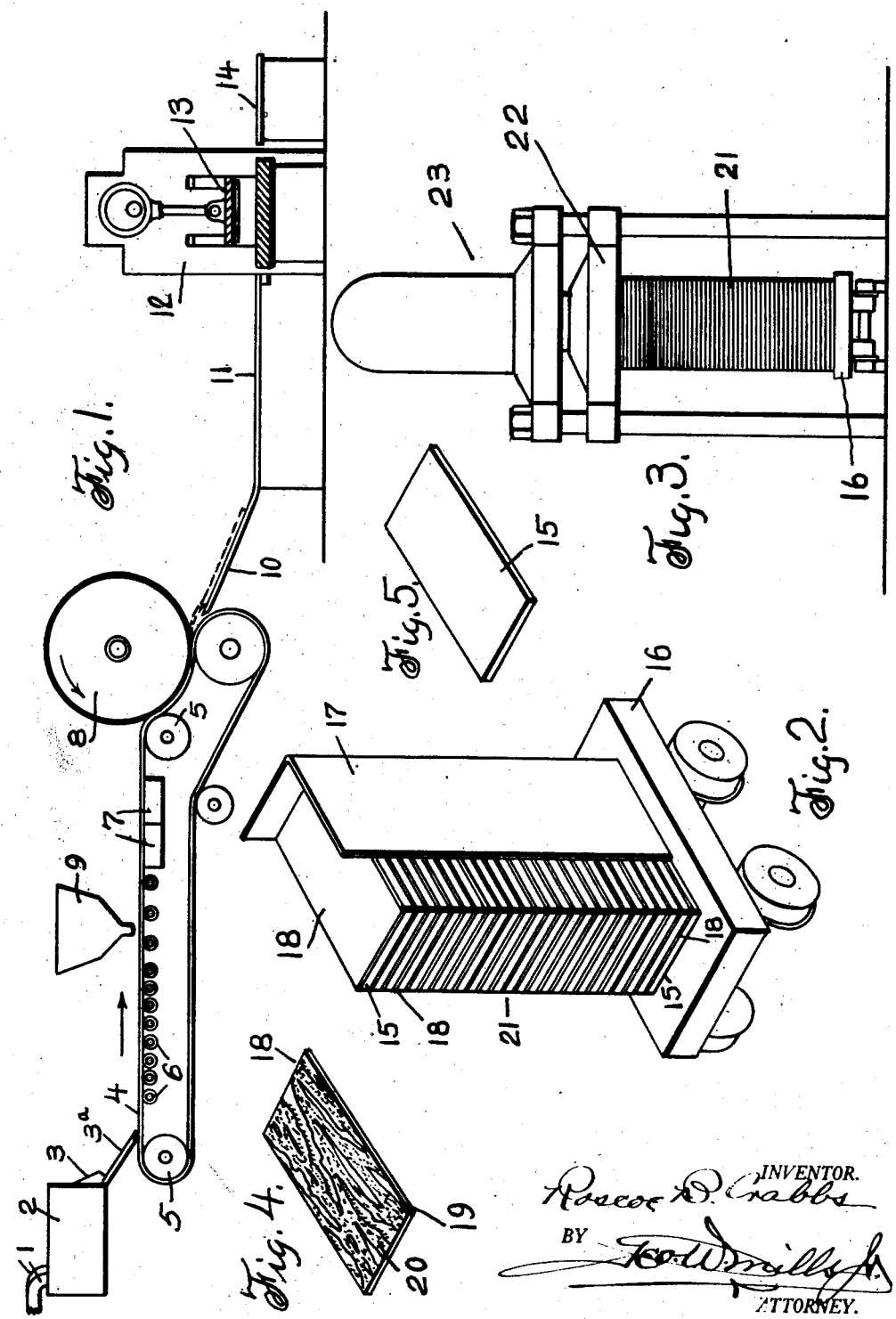

Aug. 31, 1943. R. B. CRABBS 2,328,058
MANUFACTURE OF HYDRAULIC CEMENT PRODUCTS
Original Filed April 4, 1933   2 Sheets-Sheet 2

INVENTOR.
Roscoe B. Crabbs
BY
ATTORNEY.

Patented Aug. 31, 1943

2,328,058

UNITED STATES PATENT OFFICE 2,328,058

MANUFACTURE OF HYDRAULIC CEMENT PRODUCTS

Roscoe B. Crabbs, Morristown, N. J., assignor to The Philip Carey Manufacturing Company, a corporation of Ohio Continuation of application Serial No. 664,454, April 4, 1933. This application December 1, 1938, Serial No. 243,468

5 Claims. (Cl. 25—154)

This invention relates to asbestos-cement shingle and siding products and molding plates by which said products are provided with a decorative design impressed in the weather exposed face of the products. The design is formed by narrow ridges and depressions of irregular height, width and depth predominantly longitudinally disposed to drain the surface of the shingles.

The products are preferably formed of asbestos fiber mixed with cement. The mixture is molded in sheets with a molding plate provided with the design that is to be impressed upon the exposed surface of the sheets. Several sheets may be molded at a time with any number of sheets alternately disposed in a stack with the molding plates. The molding plates are preferably formed by coating a rigid base, such as metal, with some composition material which may be readily embossed with the desired design. Vulcanized rubber is suitable for covering the metal plate. The metal plate is covered with a rubber coating and then the rubber coating is vulcanized with a reverse replica of the decorative design desired. When the rubber facing has become worn or the design impaired, it can be replaced with a new rubber facing applied to the metal base.

For a better understanding of the invention reference may be made to the accompanying drawings in which:

Fig. 1 is a diagrammatic view of a machine for producing a laminated sheet from which the shingles are formed;

Fig. 2 is a perspective view of a truck for handling a laminated pile of the shingle bodies and their interposed surface forming plates.

Fig. 3 is a diagrammatic view illustrating a hydrostatic press with a truck load of shingle bodies and their interposed surface forming plates under the ram.

Fig. 4 is a perspective view of one of the surface forming plates;

Fig. 5 is a perspective view of a shingle blank after it has been stamped from the sheet stock.

Figure 6:
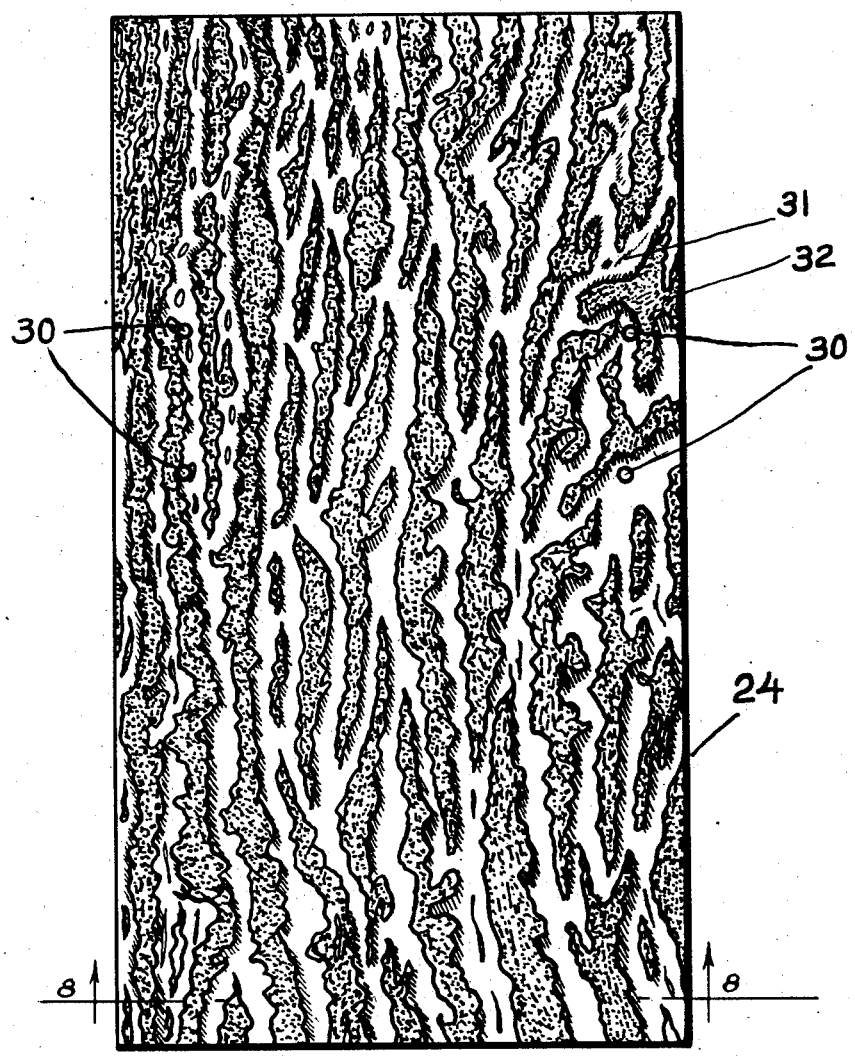
Fig. 6 is a face view of a finished shingle body.

In the production of the shingle products, the stock of the desired mixture of asbestos fiber and cement is supplied, through pipes 1, to a mixing tank 2, from a series of stock pumps (not shown). From the mixing tank 2, the stock flows through spout 3, over an apron 3a', to an endless traveling felt conveyor 4. This traveling felt conveyor 4 is carried on drive rolls 5, and travels over carrier rolls 6, these carrier rolls supporting the felt to which the stock is delivered. The felt 4 travels to the right in the direction of the arrow, and the thin layer of stock has the excess water drawn from it by suction boxes 7. As the felt 4 continues its forward travel, the thin layer of shingle stock is picked up by accumulator roll 8 and is carried around thereby until a laminated form of the desired thickness is built up.

The layer of stock on roll 8 is added to, a layer for each revolution of the roll. On the first lamination of stock which contacts with the face of the roll 8, there is deposited, while the stock is on traveling felt 4 and before being taken up on the roll 8, a layer of coloring material from color bin 9. This coloring material may be finely powdered slate or other mineral coloring of a weather proof character and is deposited in an even layer on the surface of the stock on felt 4 which is picked up by roll 8 and forms the inner surface of the laminated stock on roll 8.

When the desired thickness has been built up by the convolution applied to the roll 8, the machine operator slides a cutter across the face of roll 8 to sever the laminated stock from the roll 8, as shown in dotted line at 8a (Fig. 1), and deposit it on sloping table 10, from which it is slid forward by hand to table portion 11, which is directly attached to a punch press 12.

This punch press 12 has a die plunger 13 for stamping out of the sheet of laminated stock the shingle blanks which are then removed from the press and placed on table 14. These shingle blanks 15 (Fig. 5) are, while in a plastic state, susceptible of easy handling, and are manually removed and piled in a stack on a wheeled truck 16.

A guide member 17 to vertically align the stack is placed in position on the truck 16, and the first shingle blank, laid color side upward on the metal top of the truck, is brought into position by guide member 17.

So far, there has been set forth the steps that are used to produce a shingle blank having a smooth surface finish which may be colored on one surface with the opposite surface in the natural finish of the combined basic material or by omitting the coloring strip described may have two surfaces of the color of the basic material, into which may have been mixed any suitable coloring pigment.

It is desired, however, to overcome the objections heretofore made to shingles of this type having a smooth surface and to do so the surface of the shingles, when in a finished state, are, in the form herein described, provided with a surface to simulate a surface which has long been subjected to, and attacked by, weather conditions resulting in the exposed portions having become surface-ridged and furrowed by the action of the elements. The process to accomplish this will now be set forth.

The surface that it is desired to simulate on the finished shingles is produced by bringing the plastic surface of the shingle blanks into contact with a surface forming plate 18 provided with a surface which is a reverse replica of the surface it is desired that the finished shingles have. The surface plate 18 (see Fig. 4) consists of a steel bed 19, the size of which is at least equal to that of the shingle being produced. This steel plate has vulcanized to one face, a hard rubber matrix 20, having a surface in reverse replica of the surface that is to be produced on the plastic shingle blanks. The opposite surface of the plate 18 is relatively smooth.

These plates 18 may have the hard rubber matrixes 20 produced in a variety of patterns and thus vary the surface appearance of the shingles produced by contact with the plate faces.

Returning now to the truck 16 and to the first plastic shingle blank laid thereon. There is now placed over the plastic shingle blank 15, one of the plates 18, with its matrix face in contact with the face of the plastic shingle blank.

The smooth back of the metal plate 18 is uppermost; upon this is laid a second plastic shingle blank with (if colored) its color face uppermost and again a plate 18 is laid on the shingle blank with its matrix face 20 downward and its smooth back face uppermost. This alternating of the plates 18 and the plastic shingle blanks 15 continues until a stock of molds and plastic shingle blanks have been formed on truck 16 as indicated at 21, Figure 2.

The plates 18, previous to being placed upon the shingle blanks 15, are preferably dipped in oil to prevent adhesion of the plastic material of the shingle blanks to the matrix face of the molds. When the stack 21 is complete, the guide member 17 is removed and the truck 16, with the completed stack 21, is run under the ram 22 of hydrostatic press 23.

Pressure is applied to the ram 22, and the stack 21, composed of alternating plates 18 and plastic shingle blanks 15, is subjected to pressure which removes moisture and surplus oil from the stack of plastic shingle blanks and the plates and sets the asbestos and cement content into a compact shingle, and provides the shingle with one surface which has furrows and ridges irregular in length, depth, or form. It is preferable to have these furrows and ridges extending longitudinally of the shingle so that when in place on a structure they serve to guide rain, snow, etc., in the desired direction. The pressure tends to compact the shingle material, resulting in the shingle being more compact or of greater density in its thinner portions 32' while less dense in its thicker portions. As the pressure is applied the high spots on the matrix 20 tend to set up a flow of the mass into the low spots or valleys on the matrix which form the high portions on the finished shingle. This flow causes the fibers or some of them in the mass to assume a position transverse to the longitudinal lay of the valley and this, with the increased fibers in the thin portion of the shingle due to the density of the mass, adds to the strength of the shingle in its thinner portion and tends to equalize the strength in both thick and thin portions.

After the pressure application to the stack, the ram 22 is raised, and the truck, with its compressed stack of shingles and molds, is removed from the press 23 to a drying and curing room where the entire stack 21 is removed from the truck 16 and left to cure and age.

After sufficient time has elapsed for the curing process, the molds are then removed from their positions between the now complete shingles and again used for further production purposes.

It has been found in practice that the use of rubber faced plates produce a design surface upon the shingle blanks without any of the plastic materials adhering to the rubber surface of the matrix face of the plates 18, and that these rubber faced plates 18 may be repeatedly used over and over again.

Figure 7:
Fig. 7 is an end elevation of a ridge roll or a curved shingle having a surface similar to that shown in Fig. 6.
Figure 8:
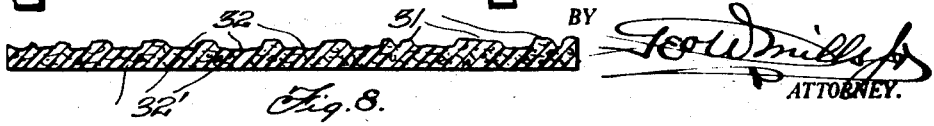
Fig. 8 is a cross-sectional view taken on line 8—8 of Fig. 6.

There is shown in Fig. 6 the finished surface of a shingle 24 having the ridges 31 and the furrows 32 which are of varying heights or depths as shown in cross section in Fig. 7 showing a curved shingle. This shingle is curved after being pressed to provide the finished surface and before it is cured. In the finished shingle the thickness varies because of the varying heights of the ridges and the varying depths of the furrow or valleys between ridges.

In asbestos-cement products due to efflorescence the free lime in the product tends to rise to the surface and deposit there an irregular marring of the surface when the surface is flat. My improved shingle greatly counteracts the effect of the marring which results from efflorescence by breaking up the surface into ridges and furrows or valleys, thereby breaking the color effect due to the irregular heights and depths of the ridges and furrows, creating shadows of different intensities and generally providing a beautiful soft weather aged effect, and at the same time providing valleys into which deposits of the free lime tend to gather while the elevations are rather free from such deposits. This, due to shadows caused by the ridges being thrown over the valleys, tends to prevent the visibility of any free lime in the valleys. Also, as the elevations or ridges are generally more readily acted upon by weathering due to the same being more exposed to the elements results in a removal by the elements of any slight deposits on the ridges.

After the shingles are cured they may then be cut or trimmed if desired and have holes 30 provided in them for nails. If holes are provided it may be sometimes desirable to have them in a thicker portion of the shingle as shown in Fig. 6.

This case is a continuation of my application Serial No. 664,454, filed April 4, 1933.

Having set forth the process and product it is desired to secure by Letters Patent the following claims:

1. As an article of manufacture an impression plate for use in a press mold for molding hydraulic cement and fiber products with a decorative design comprising a metal plate, a composition non-metallic covering material fixed to one side of the plate, and narrowly spaced elevations and depressions of irregular heights and depths formed in the composition covering for impressing said products.

2. As an article of manufacture an impression plate for use in a press mold for molding hydraulic cement and fiber products with a decorative design comprising a metal plate, a rubber facing fixed to one side of the plate, and narrowly spaced elevations and depressions of irregular heights and depths formed in the composition covering for impressing said products.

3. As an article of manufacture an impression plate for use in a press mold for molding hydraulic cement and fiber products comprising a metal plate and a covering of non-metallic material permanently bonded to that face of said plate which is exposed to the material to be molded.

4. As an article of manufacture an impression plate for use in a press mold for molding hydraulic cement and fiber products comprising a metal plate and a covering of non-metallic material vulcanized to that face of said plate which is exposed to the material to be molded.

5. A process of manufacturing composition shingles having a weather exposed surface simulating the grain of weathering comprising forming an embossing member provided with a plurality of elongated differently dimensioned narrow stripes which are of varying width from end to end and of varying degrees of separation from adjacent stripes, treating the embossing member with oil to prevent sticking, and impressing the shingles with the embossing member to form a reverse replica of the stripes across the full exposed width thereof.

ROSCOE B. CRABBS.